United States Patent

[11] 3,598,975

| | | | |
|---|---|---|---|
| [72] | Inventors | William R. Miller | |
| | | Concord; | |
| | | Charles A. Mossman, Knoxville, both of, Tenn. | |
| [21] | Appl. No. | 829,913 | |
| [22] | Filed | June 3, 1969 | |
| [45] | Patented | Aug. 10, 1971 | |
| [73] | Assignee | The United States of America as represented by the United States Atomic Energy Commission | |

[54] TIME-PROPORTIONING PROCESS INTERFACE FOR DIRECT COMPUTER CONTROL
5 Claims, 5 Drawing Figs.

[52] U.S. Cl. ............ 235/151.1,
328/135, 331/135, 235/153, 340/419, 332/9
[51] Int. Cl. ....................................... G05b 11/01
[50] Field of Search ............................ 328/135,
134, 114; 322/9 R, 9 T; 235/151.1, 151; 331/135, 136, 151, 111

[56] References Cited
UNITED STATES PATENTS
3,079,539  2/1963  Guerth .................. 332/9 X
3,207,950  9/1965  Smith .................... 328/135 X
3,390,354  6/1968  Munch ................... 332/9
3,440,566  4/1969  Swanson ................ 328/114 X
3,482,113  12/1969  Heesh ................... 307/229
3,482,188  12/1969  Crouse .................. 331/135

Primary Examiner—Eugene G. Botz
Attorney—Roland A. Anderson

ABSTRACT: An interface device has been provided which converts a computer-derived analog control signal to a time-proportioning signal for controlling a process. A plurality of control modules, one for each process, are fed by separate computer-derived control signals together with a commonly applied triangular time base signal. The triangular time base signal is generated in a unique manner by means of a loop connected amplitude controlled ramp function generator and a differentiator. The time base signal is compared with the analog computer signal in each process control module to produce a time-proportioning (on-off) signal to the final control element associated with that module.

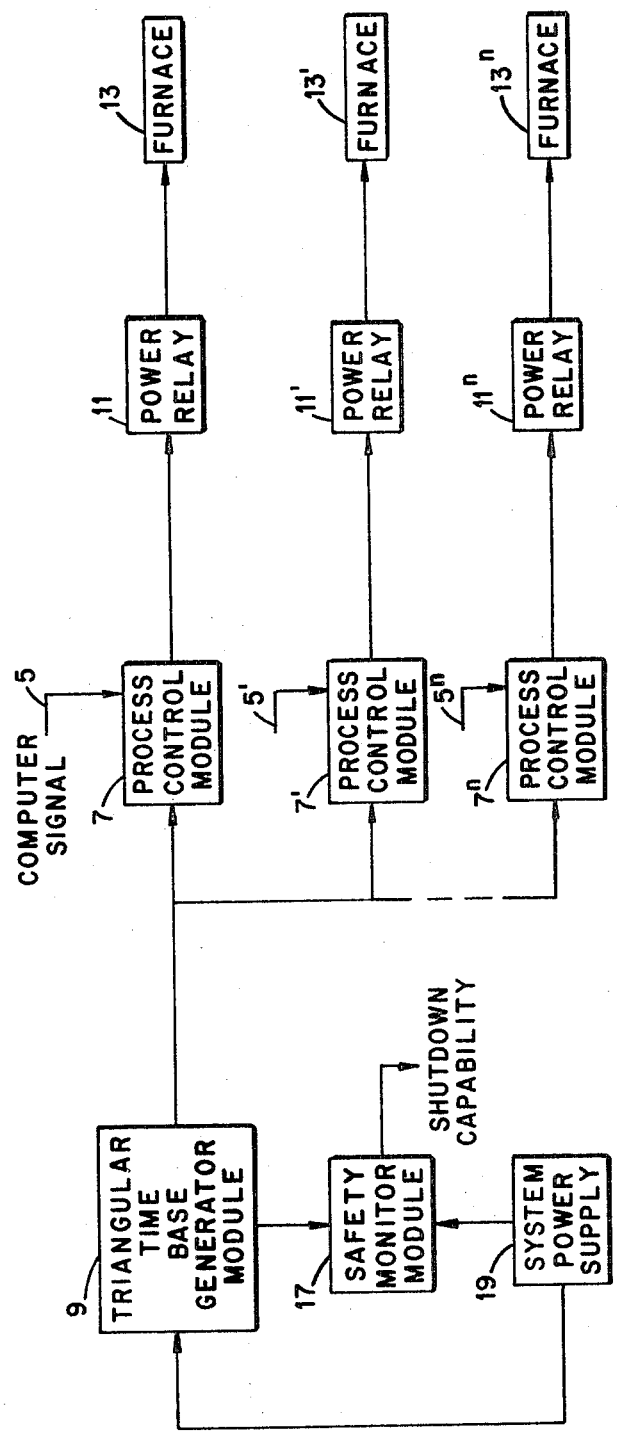
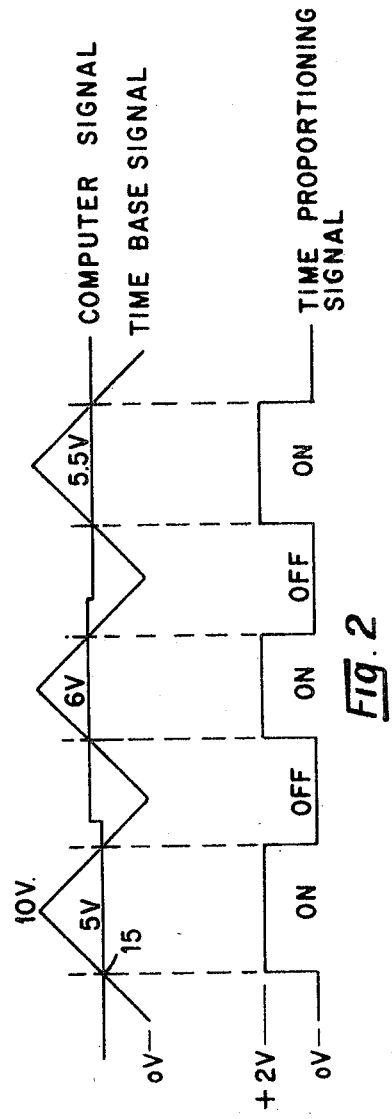

INVENTORS.
William R. Miller
Charles A. Mossman

BY

ATTORNEY.

TIME-PROPORTIONING PROCESS INTERFACE FOR DIRECT COMPUTER CONTROL

BACKGROUND OF THE INVENTION

This invention was made during the course of, or under, a contract with the U.S. Atomic Energy Commission.

The present invention relates to circuits for computer control of a process and more specifically to an improved inexpensive interfacing circuit for time proportioning computer control of a plurality of control processes.

In a computer-based control system, the computer acquires data and calculates solutions to control problems. The computer can attend to many individual control loops in sequence at data-processing speeds. The computer can be utilized at multiprocess unit installations when the cost of the computer and its interface approaches or is less than the cost of the individual controllers, recorders, and final control elements (SCR rectifiers or saturable reactors) it eliminates.

In the field of industrial control, there is known the technique of time-proportioning control. By this technique, the manipulated variable is not adjusted continuously as by an expensive silicon control rectifier or saturable reactor control unit but is varied in an on-off control action by a simple relay. It is customary in utilizing this technique to employ the usual proportional, reset, and rate calculations in the generation of the control signal which then varies the on-to-off time ratio of the relay. Additional information on this type of control may be had by referring to *Automatic Control for Power and Process*, Chapter 4, McGraw Hill, 1964. Considerable economics can be realized by this time proportioning control method. It is applied to processes where the time constant is not too short.

In the past, computer-process interface systems used with SCR's or saturable reactors have been quite complicated and expensive. Therefore, their use is limited to large computer controlled process systems where the cost can be justified. Thus, it can be seen that there is a need for a simple inexpensive interfacing system for use with small computers to control a relatively small number of processes.

SUMMARY OF THE INVENTION

It is one object of this invention to provide a a relatively simple and inexpensive interfacing system for direct computer control of a relatively small number of processes.

It is another object of this invention to provide an interfacing circuit, for direct computer control of a number of processes, having a triangular time base signal generator for generating a time base signal that is compared with computer-derived control outputs to generate individual on-off time proportioned control signals to the process.

Other objects and many of the attendant advantages of the present invention will be apparent from the following description.

Briefly, the present invention is an interfacing circuit for providing direct computer control of a number of processes, comprising: a plurality of control modules for generating on-off control signals to each process, each control module having a first input to receive a control signal from the computer, a second input to receive a time base signal and an output to transmit the on-off control signal to the process when the input signals have a proper relationship; and a time base signal generator including a loop-connected ramp function generator and a signal differentiator, thereby providing a repeating triangular waveform time base signal at the output of the ramp function generator. The triangular signal is fed to each control module simultaneously and, upon application of the individual computer control signal from the computer, is compared with the computer control signal to generate the on-off signal.

BRIEF DESCRIPTION OF THE DRAWINGS

FIG. 1 is a block diagram of an interfacing circuit according to the present invention;

FIG. 2 is a graphic illustration showing the controlling operation of the circuit of FIG. 1;

DETAILED DESCRIPTION OF THE INVENTION

Figure 3:
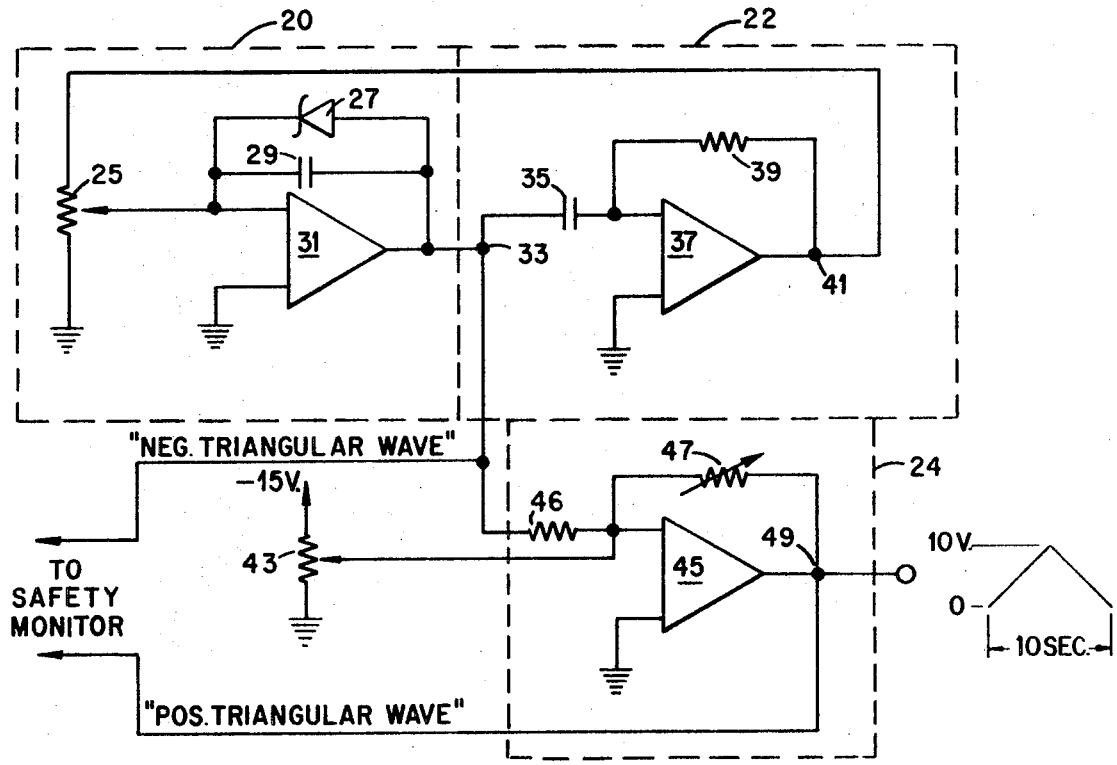
FIG. 3 is a schematic diagram of the time base generator of FIG. 1.

For purposes of detailed explanation, a typical application of the present invention to the control of a bank of furnaces is hereinafter described, wherein control is effected by varying the on-to-off time of a relay at a rate controlled by a computer-derived control signal, to bring the controlled temperature condition at each furnace into the desired control point.

FIG. 1 shows the general assembly of apparatus in block diagram form, wherein the flow of information is indicated by connecting lines provided with arrows in the direction of information transmission. Since the generation of a control signal by a computer for time-proportioning control is well known in the art, it is not shown in the drawings in order that the figure may be simplified and limited only to the clear showing of the present invention. Typically, the signal is generated in the computer in the following manner: a process variable, in this application a furnace temperature, is sampled by a sensor, compared to an associated set point stored in computer memory, and an error signal is produced that is proportional to the deviation from the desired set point. A reset, rate, and line voltage compensation calculation is then executed and the analog control output signal is generated. Such control signals are generated sequentially for each process and an update time of 10 seconds is typical for the present application. The only requirement for any process being controlled is that the computer's update time be kept shorter than the time constant of the process. Update times on a computer can be made quite small so that processes having a time constant of one second or even one-tenth of a second can be controlled by this arrangement.

The computer control signals are shown at inputs 5 for each control unit (FIG. 1). In each unit the associated computer signal $5,5'-5^n$ is applied to a corresponding process control module $7,7'-7^n$. The control signal from the computer is a DC signal, for this example, a positive level of a value between 0 and 10 volts. The process control module compares this signal with a triangular shaped output signal from a time base generator module 9 whose output is commonly connected to a second input of each process control module 7 through $7^n$. The triangular shaped time base signal is, for this example, also made to vary between 0 and 10 volts and repeats every 10 seconds. The novel manner in which the time base signal is generated and compared with each of the computer control signals will be discussed later herein in a detailed explanation of each of the circuit modules.

Each of the control modules 7 has their output connected to a corresponding furnace power relay 11 which, in turn, supplies power to the corresponding furnace 13 heating coils (not shown). The interaction of the computer control signal at input 5 with the ever present time base signal at the process control module 7 produces a time proportioning (on-off) signal to power relay 11 and its associated furnace 13. The computer-generated control signal is indicative of the power level necessary to keep the furnace temperature in agreement with the set point and the signal generated at the output of the process control module then switches the power relay accordingly to provide on-off time proportional control.

This time proportioning control is achieved in the present interface with only two basic circuit modules, i.e., the time base generator module 9 and, for each control loop, one process control module 7. A safety monitor module 17 (FIG. 1) is provided which monitors the time base generator module 9 and the system bipolar power supply 19 to shut down the system in a conventional manner if either the time base generator or the power supply fails.

In FIG. 2 the time base signal together with a typical computer control signal that reaches, for example, the process control module 7, are shown superimposed upon each other. Assume for purposes of illustration that the update time of the computer is approximately 10 seconds; that is, a new control signal reaches process control module 7 about every 10 seconds. Control module 7 functions in such a way that every time the two input signals cross, as at point 15, the power relay 11 switches from one state to the other, thereby proportioning power to furnace 13 at a rate set by the magnitude of the computer control signal. It will be seen in FIG. 2 that the computer control signal update time does not have to coincide in time with the base signal.

Referring now to FIG. 3, there is shown the time base generator 9 is schematic form. The generator consists of three principal components: a ramp generator 20, a differentiator 22 and a signal conditioner 24, all shown outlined by dotted lines. The ramp generator 20 includes an operational amplifier 31 which has a feedback circuit comprising a parallel connected capacitor 29 and a 10-volt rater zener diode 27 coupled between the input and output of amplifier 31. The output of amplifier 31 is connected through a differentiating capacitor 35 to the input of an operational amplifier 37 with a gain of about 20,000 due to a feedback resistor 39 connected between the input and the output of amplifier 37. The output of amplifier 37 is, in turn, connected to the input of amplifier 31 via a potentiometer 25. It will be seen that those two parts of the time base generator 15 functions as a recycling circuit. When the voltage at point 33 has built up to the zener voltage, approximately 9.4 volts negative, for this example, the diode conducts, sharply stopping the advance of the ramp. As a result, differentiator 22 abruptly develops a negative voltage spike at point 41. This action is sufficient to reverse the polarity of the input to ramp generator 20, taking diode 27 out of conduction and initiating the ramp in the positive direction. Differentiator 22 again is developing a constant voltage, negative this time, at point 41, which keeps ramp generator 20 going until diode 27 again conducts, the voltage at point 33 being approximately 0.6 volt positive. Again, a reverse voltage spike, positive this time, occurs at point 41 when diode 27 conducts. Thus, ramp generator 20 and differentiator 22 operate on each other, developing at point 33 a repeating triangular waveform ranging from approximately −9.4 volts to +0.6 volts. When potentiometer 25 is properly adjusted, the period of this waveform is approximately 10 seconds. This signal is arbitrarily termed "the negative triangular wave signal," or just "negative signal," in the description that follows.

To continue the description of the triangular wave generator, this "negative signal" output is connected through a resistor 46 to an inverting operational amplifier 45 of the signal conditioner 24 to produce the "positive triangular time base signal" or just "positive signal." Potentiometer 43 connected between the −15 v. supply and ground potential, with its adjustable arm connected to the input of amplifier 45 for zero adjustment, and variable resistor 47, which is connected in parallel with amplifier 45 for span adjustment, cause the output signal to be converted from a +0.6 to −9.4 volts signal to a 0 to 10 volts signal having a 10-second time base. This 0 to +10 volt, 10-second cycle triangular wave signal is the aforedescribed time base signal that is fed to all of the individual process control modules. A As shown in FIG. 3, this signal, together with the "negative signal," is also fed to the safety monitor module which will now be explained in detail.

Figure 4:
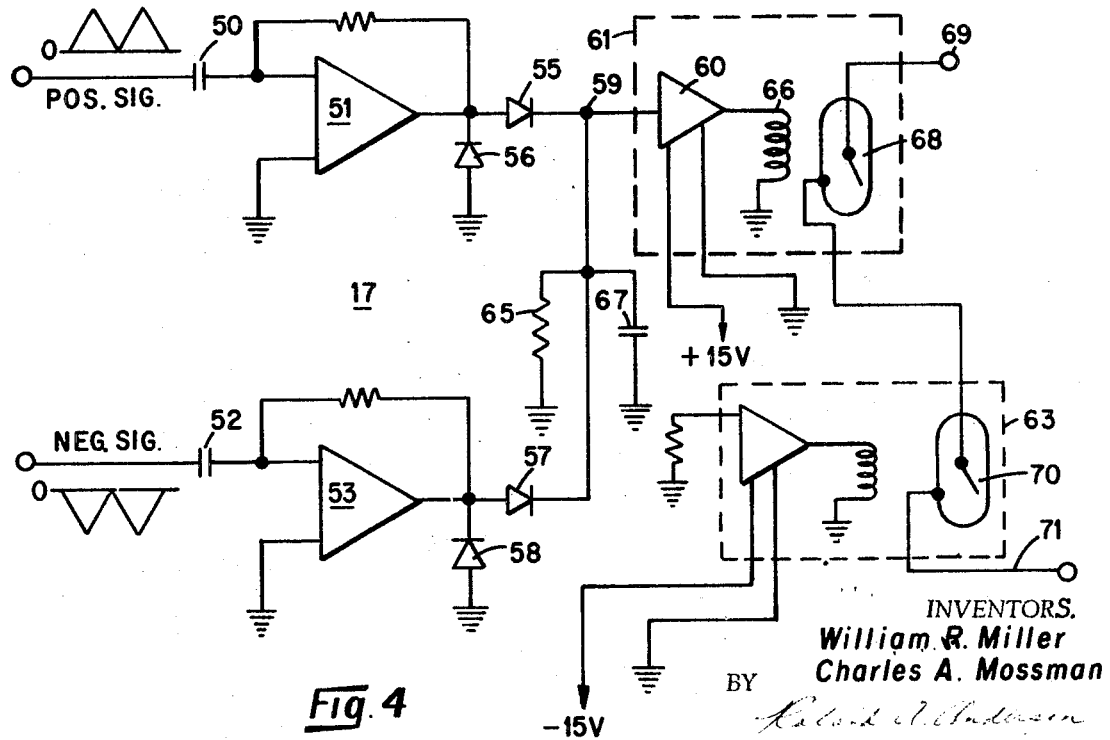
FIG. 4 is a schematic diagram of the safety monitor shown in FIG. 1.

Referring now to FIG. 4, the aforementioned triangular shaped "positive signal" and "negative signal" outputs from generator 9 are coupled to inverting operational amplifiers 51 and 53 through differentiating capacitors 50 and 52, respectively, of the safety monitor 17. Amplifier 51 is connected as a differentiator so that the increasing portion of the "positive signal" applied at the input results in a negative signal at the output thereof. The output of amplifier 51 is connected through a diode 55 to the input of an amplifier 60 of reed relay module 61. Diode 55 is connected with its anode to the amplifier 51 output so that it blocks the negative signal output from reaching point 59. A second diode 56 having its cathode connected to the output of amplifier 51 and its anode connected to ground passes the negative signal to ground. Simultaneously, amplifier 53, connected as a differentiator, receives the negative triangular signal. This signal is inverted and differentiated, resulting in a positive signal from amplifier 53. As in the above case, the output of amplifier 53 is connected to point 59 via a diode 57 and to ground via a diode 58 so that the positive signal is passes to point 59. Conversely, when both signals have reversed direction, a positive signal passes diode 55 and a negative signal is blocked by diode 57. Thus, a train of positive pulses are applied to amplifier 60 of reed relay module 61, keeping contact 68 of relay 66 closed. As the signal that is fed to the input of amplifier 60 is a composite, made up of signals from diodes 55 and 57 which follow closely upon one another, resistor 65 and capacitor 67, each connected between point 59 and ground, combine to smooth out the transition between the pulses to assure that relay contact 68 does not open under normal operation.

Thus, it will be realized that relay module 61 is an effective monitor of the triangular time base signal, and thus the operation of the ramp generator 20 since the loss of either positive or negative signals will cause relay contact 68 to open. In addition, relay module 61 serves to monitor the +15 volt potential from the system power supply in that the power supply also provides the operating voltage for amplifier 60. Thus, if the power supply fails, the amplifier output will be turned off allowing the relay contact 68 to open.

Reed relay module 63 completes the safety monitor. Its contact 70 is wired in series with the contact 68 of relay 66. Relay module 63 serves to monitor the negative 15-volt output of the system power supply and will open if the power supply fails. Thus, output terminals 69 and 71 would be used in a conventional manner as by connecting them in series with a start circuit to shut down the system if either of the relay contacts 68, 70 open.

Figure 5:
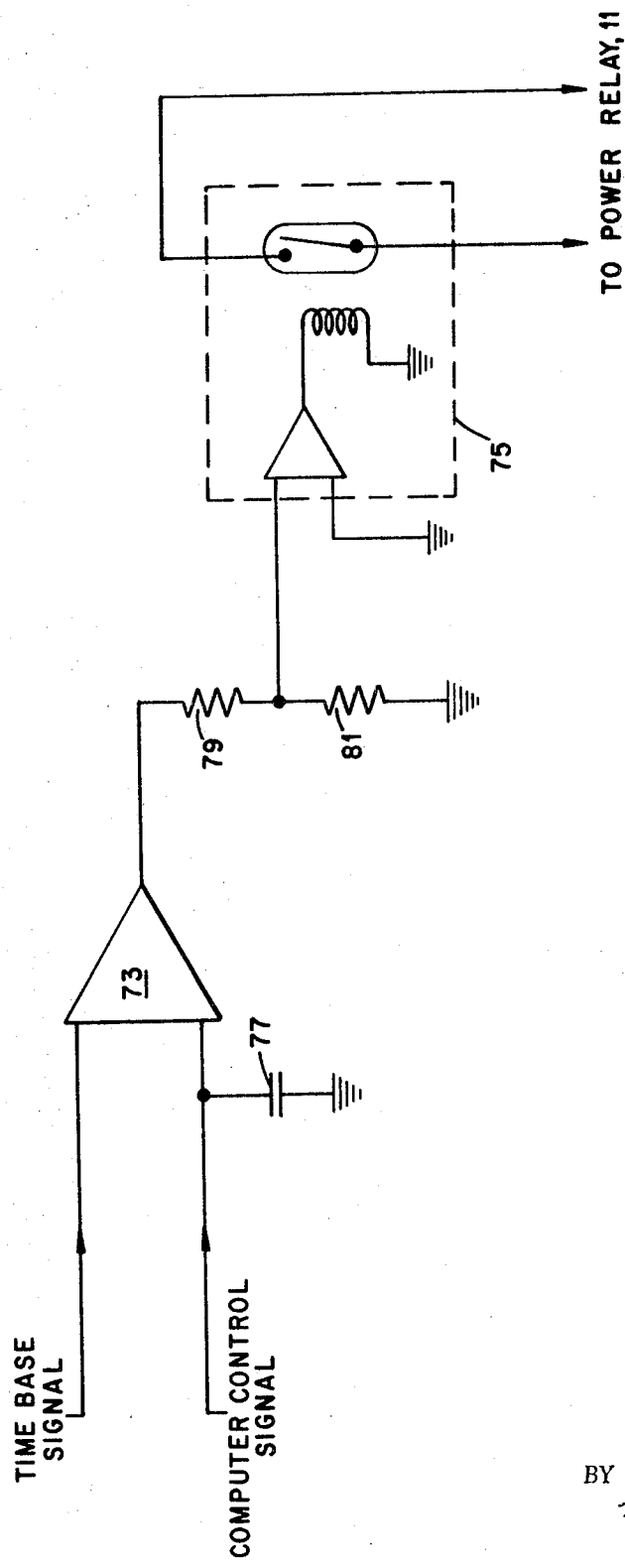
FIG. 5 is a schematic diagram of one control module of FIG. 1.

In FIG. 5 is shown one of the identical process control units 7—7$^n$ that accomplishes the time proportioning conversion for its associated furnace control loop. Each module includes a field effect transistor (F.E.T.) high gain operational amplifier 73. The appropriate computer signal is connected to one input of amplifier 73 while the time base signal is connected to a second input thereof. As these signals cross the point of equal amplitude (see FIG. 2), the amplifier 73 output switches to saturation in either the positive or negative direction. Only a few millivolts of difference in the two signals are required to change the output state since the amplifier is operating without feedback at a gain of approximately 80,000. The output of amplifier 73 feeds a voltage divider consisting of series connected resistors 79, 81 which reduces the saturation voltage to about 2 volts for the input to a relay module 75. Relay module 75 is identical to the reed relays discussed above in the safety module and its contact is opened and closed with the switching action of amplifier 73 to proportion power to the appropriate power relay 11 (shown in FIG. 1).

Another important aspect of this invention is the effect provided by capacitor 77 connected between the computer control input of amplifier 73 and ground. This holds the signal once impressed on the high impedance input of an F.E.T. operational amplifier (as 73 in FIG. 5) so that the amplifier acts as though the input signal were still there even though the actual computer control signal is removed. This sample and hold characteristic has been extended in excess of four hours by the use of a very low charge leakage capacitor 77 at the high impedance input of the F.E.T. operational amplifier 73. Therefore, if a computer outage occurs, the last received signal level from the computer is effectively held in amplifier 73, permitting the last received power level to remain on furnace 13 (FIG. 1) for a time in excess of four hours. Normally this is sufficient time to get the computer back on line or shut down all of the process units.

Since the operation of each individual module has been discusses in the detailed explanation above, the overall operation will be briefly discussed with reference to FIG. 1. When the system is started, the time base signal generator 9 applies its triangular shaped signal, repeating every 10 seconds, to each process control module 7 simultaneously. The computer control signal for the first furnace is applied to input 5 of module 7 and the signal is held there by module 7 for approximately ten seconds until updated. During the updating time, the computer applies control signals to inputs $5'-5^n$ of process modules $7'-7^n$, respectively, in turn, which are held at the particular control levels until updated, approximately 10 seconds later in each case. Each time the voltage level of the two signals applied to the respective process control modules $7-7^n$ cross, the output of the module $7-7^n$ will switch so that power relays $11-11^n$ turn their respective furnaces $13-13^n$ on and off providing the desired control of temperature.

Thus, it will be seen that an interfacing circuit has been provided which is readily adaptable to direct computer control of processes, and due to its simplicity is economically feasible for control of even a relatively small number of processes. Being in modular form, the interface is readily adaptable to any number of processes simply by adding additional control modules and adjusting the time span of the triangular time base signal to correspond with the response time of the process variable.

In view of the above and numerous other equally possible arrangements, the scope of the invention should be limited only by the following claims.

We claim:

1. In a system for computer control of a plurality of processes by time proportioning on-off control, an interfacing circuit for comparing computer-derived control signals with a generated time base signal to provide an on-off control signal comprising:

a plurality of control modules, one for each of said processes for generating said on-off control signal, each control module having first and second inputs and an output, said output being connected to respective control devices of said plurality of processes, said first input of each of said control modules being connected to receive analog control signals from said computer which very in amplitude between predetermined voltage levels; and a signal generator having a ramp function generator including an operational amplifier and a zener diode connected in parallel with said amplifier and a differentiator circuit having an input connected to the output of said ramp function generator and an output connected to the input of said ramp function generator, thereby providing a repeating triangular shaped time base reference signal at the output of said ramp function generator which varies between the same said predetermined voltage levels as said control signal, said output of said ramp function generator connected commonly to said second input of each of said control modules so that upon application of a said computer control signal to said first input of a control module, said computer control signal is compared with said time base reference signal to generate said on-off control signal.

2. An interfacing circuit as set forth in claim 1 wherein said signal generator further comprises a signal conditioner circuit including an inverting operational amplifier having an input connected to the output of said ramp function generator, a first variable resistance means connected between said input of said inverting operational amplifier and ground for varying the input signal voltage of said inverting amplifier, thereby providing adjustment for the amplitude of the output signal of said generator, and a variable resistance means connected between the input and output of said inverting amplifier for varying the time span of the output signal.

3. An interfacing circuit as set forth in claim 2 wherein each of said process control modules include a high-gain high-input impedance operational amplifier having first and second inputs and an output, said first input connected to receive said time base signal, said second input connected to receive said computer control signal so that when the amplitude levels of said signals coincide, said amplifier switches from saturation in a first current conduction direction to saturation in the reverse current conduction direction thereby providing said on-off control signal at the output thereof.

4. An interfacing circuit as set forth in claim 3 wherein said second input of said high-gain high-input impedance operational amplifier is connected to ground through a low charge leakage capacitor so that upon failure to receive a computer control signal at the input thereof, the last received signal is held for a substantially long period of time so that the particular process variable is held at the last computed control point until the computer signal can be restored or the system shut down.

5. An interfacing circuit as set forth in claim 4 further comprising a safety monitoring means connected to receive the output of said time base signal generator and outputs of a common system power supply for shutting the system down in case of a failure in either said generator or said power supply.